US007987005B2

(12) United States Patent
Rund

(10) Patent No.: US 7,987,005 B2
(45) Date of Patent: Jul. 26, 2011

(54) SYSTEM, METHOD AND PROGRAM FOR DYNAMIC CONTROL AND OPTIMIZATION OF A PROCESS HAVING MANIPULATED AND CONTROLLED VARIABLES

(75) Inventor: Anthony K Rund, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 518 days.

(21) Appl. No.: 12/002,756

(22) Filed: Dec. 19, 2007

(65) Prior Publication Data

US 2008/0195235 A1 Aug. 14, 2008

Related U.S. Application Data

(60) Provisional application No. 60/870,730, filed on Dec. 19, 2006.

(51) Int. Cl.
*G05B 13/02* (2006.01)
(52) U.S. Cl. ............... 700/36; 700/28; 700/29; 700/31; 700/33; 700/44; 703/2
(58) Field of Classification Search .............. 700/28–34, 700/40, 52, 67, 80, 36; 703/2; 708/802, 708/803; 340/3.7, 3.72, 3.9
See application file for complete search history.

(56) References Cited

U.S. PATENT DOCUMENTS

| | | | | |
|---|---|---|---|---|
| 5,477,444 A * | 12/1995 | Bhat et al. | | 700/48 |
| 5,572,420 A * | 11/1996 | Lu | | 700/33 |
| 6,246,972 B1 * | 6/2001 | Klimasauskas | | 703/2 |
| 6,253,113 B1 * | 6/2001 | Lu | | 700/28 |
| 6,438,532 B1 * | 8/2002 | Kiji | | 706/45 |
| 6,597,958 B1 * | 7/2003 | Starr | | 700/29 |
| 6,714,899 B2 * | 3/2004 | Kassmann | | 703/2 |
| 6,901,560 B1 * | 5/2005 | Guerlain et al. | | 715/833 |
| 6,917,840 B2 * | 7/2005 | Lund | | 700/33 |
| 6,950,711 B2 * | 9/2005 | Havener et al. | | 700/28 |
| 7,257,451 B2 * | 8/2007 | Carpency et al. | | 700/30 |
| 7,330,767 B2 * | 2/2008 | Thiele et al. | | 700/29 |
| 7,337,022 B2 * | 2/2008 | Wojsznis et al. | | 700/36 |
| 7,433,743 B2 * | 10/2008 | Pistikopoulos et al. | | 700/52 |

(Continued)

OTHER PUBLICATIONS

Kuehn, D. R.; Porter, J.; "The Application of Linear Programming Techniques in Process Control," Applications and Industry, IEEE Transactions on , vol. 83, No. 75, pp. 423-427, Nov. 1964 [retrieved on Mar. 4, 2010] Retrieved from Internet <URL: http://ieeexplore.ieee.org/stamp/stamp.jsp?tp=&arnumber=5407716&isnumber=5407696>.*

(Continued)

*Primary Examiner* — Ramesh B Patel
*Assistant Examiner* — Dave Robertson
(74) *Attorney, Agent, or Firm* — Merchant & Gould

(57) ABSTRACT

A system, method and computer program are provided for controlling and optimizing the operation of a process having a plurality of independently controlled, manipulated variables and at least one controlled variable dependent on the manipulated variables. The system, method and program input specified constraints for a linear program optimizer to target, calculate a set of objective function coefficients based on the inputted specified constraints, and generate a plurality of combinations of manipulated and controlled variables. The system, method and program also test each generated combination for changed values that cause the linear program optimizer to target different constraints than the inputted specified constraints, and adjust the calculated set of objective function coefficients so that the linear program optimizer targets the specified constraints.

22 Claims, 6 Drawing Sheets

U.S. PATENT DOCUMENTS

| | | | |
|---|---|---|---|
| 7,536,364 B2 * | 5/2009 | Subbu et al. | 706/13 |
| 7,577,483 B2 * | 8/2009 | Fan et al. | 700/29 |
| 7,650,195 B2 * | 1/2010 | Fan et al. | 700/31 |

OTHER PUBLICATIONS

Narraway, Lawrence T. and Perkins, John T. Selection of process control structure based on linear dynamic economics. Industrial & Engineering Chemistry Research 1993 32 (11), 2681-2692 [retrieved on Mar. 4, 2010] Retrieved from Internet<URL: http://pubs.acs.org/doi/abs/10.1021/ie00023a035>.*

Halvorsen, I. J.; Skogestad, S.; Morud, J. C.; Alstad, V. Optimal selection of controlled variables. Ind. Eng. Chem. Res. 2003, 42 (14), 3273-3284.*

Mohideen, M. J. Perkins, J. D. Pistikopoulos, E. N. Optimal Synthesis and Design of Dynamic Systems under Uncertainty. Computers in Chemical Engineering, 1996, vol. 20, Suppl, pp. S895-S900 [retrieved on Mar. 8, 2010] Retrieved from Internet<URL:http://www.enq.ufrgs.br/cursos/pos/Controle/2007/Referencias/PerformanceAssessment/uncertaninty_sintese>.*

* cited by examiner

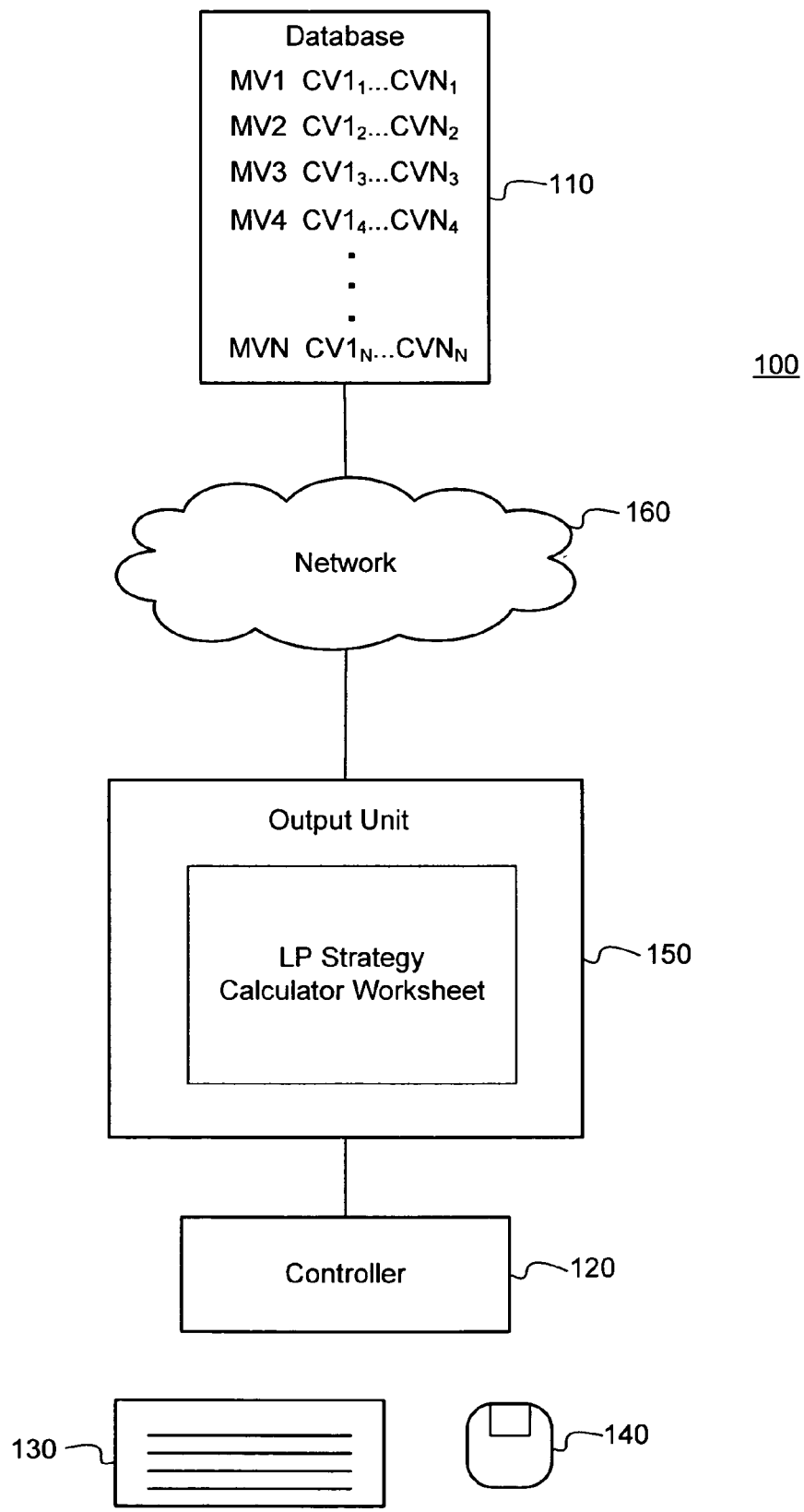

Fig. 2

CV Table Worksheet

| CV Tag | Description | Strategy | Constraint Movement | | | | | Calc | | |
|---|---|---|---|---|---|---|---|---|---|---|
| | | | LoLim | Current | HiLim | Range | ShadV | 1:53FC038.S | CV Cost | Mvsum |
| 1:53LC011.PV | OhdDrumLvl | none | -10000.00 | -290.8113 | 10000.00 | 0.000000 | 0.000000 | -0.085342884 | 0.000000 | 0.000000 |
| 2:53PD044.PV | AbsC220DP | none | -10000.00 | 70.99532 | 10000.00 | 0.000000 | 0.000000 | 0.03208135 | 0.000000 | 0.000000 |
| 3:53FC045.PV | AbsC220_Out | none | -10000.00 | 5287.213 | 10000.00 | 0.000000 | 0.000000 | 1.426831 | 0.000000 | 0.000000 |
| 4:53F1053.PV | Deeth O Gas | none | -10000.00 | -10000.00 | 10000.00 | -128885.0 | 0.525068 | 12.08856 | 0.000000 | 0.000000 |
| 5:53CX019.PV | Deeth Flood % | none | -10000.00 | 845.69660 | 10000.00 | 0.000000 | 0.000000 | 0.3011486 | 0.000000 | 0.000000 |
| 6:53CX020.PV | Debut Flood % | none | -10000.00 | -3991.859 | 10000.00 | 0.000000 | 0.000000 | 0.1440176 | 0.000000 | 0.000000 |
| 7:53CX021.PV | LPG_RVP_kP | none | -10000.00 | -2625.212 | 10000.00 | 0.000000 | 0.000000 | 3.0478890 | 0.000000 | 0.000000 |
| 8:53CX022.PV | LCN_RVP_k | none | 0.000000 | -163.0534 | 0.00 | 0.000000 | 0.000000 | 0.1531265 | 0.000000 | 0.000000 |
| 9:53CX023.PV | 53PC028 DP | none | -25822.32 | -25822.32 | 10000.00 | -1481.349 | 3.556027 | -6.570436 | 0.000000 | 0.000000 |
| 10:53CX024.P | PC029_0set | none | -10000.00 | 10000.00 | 10000.00 | 2209.847 | -0.017214 | -6.936588 | 0.000000 | 0.000000 |
| 11:53CX025.P | LCNabsBypa | none | -10000.00 | -2158.139 | 10000.00 | 0.000000 | 0.000000 | -0.5019857 | 0.000000 | 0.000000 |
| 12:53CX026.P | LPG_C2calc | none | -10000.00 | 892.9531 | 10000.00 | 0.000000 | 0.000000 | 0.1693759 | 0.000000 | 0.000000 |
| 13:53CX027.P | LPG_C5calc | none | -10000.00 | -95.22264 | 10000.00 | 0.000000 | 0.000000 | -0.04902092 | 0.000000 | 0.000000 |
| 14:53AI001C.P | LPG H2S % | none | -10000.00 | 61.01691 | 10000.00 | 0.000000 | 0.000000 | 0 | 0.000000 | 0.000000 |
| 15:53FC104.P | FOBtoReb E2 | none | -10000.00 | -5319.473 | 10000.00 | 0.000000 | 0.000000 | 0 | 0.000000 | 0.000000 |
| 16:53FC038.M | LCN2 C220ab | none | -10000.00 | 6557.606 | 10000.00 | 0.000000 | 0.000000 | 1.769665 | 0.000000 | 0.000000 |
| 17:53PC027.M | Deeth C222XP | none | -10000.00 | 7321.336 | 10000.00 | 0.000000 | 0.000000 | 1.432771 | 0.000000 | 0.000000 |
| 18:53FC215.M | ICG2DethReb | none | -10000.00 | 1091.337 | 10000.00 | 0.000000 | 0.000000 | 0.4835702 | 0.000000 | 0.000000 |
| 19:53FC104.M | FOBtoDeBRe | none | -10000.00 | -10000.00 | 10000.00 | -4310.690 | 3.332511 | -0.930852400 | 0.000000 | 0.000000 |
| 20:53FC052.M | Debut C223Rf | none | -10000.00 | -3587.967 | 10000.00 | 0.000000 | 0.000000 | 0 | 0.000000 | 0.000000 |
| 21:53PC028.M | Debut C223P | none | -10000.00 | -10000.00 | 10000.00 | -3767.428 | 7.188675 | 0 | 0.000000 | 0.000000 |
| 22:53PC029A. | Deb OhdD C22 | none | -10000.00 | -2236.293 | 10000.00 | 0.000000 | 0.000000 | 0 | 0.000000 | 0.000000 |
| 23:53FC056.M | LPGto66 C2 | none | -10000.00 | 451.4133 | 10000.00 | 0.000000 | 0.000000 | 0 | 0.000000 | 0.000000 |

Fig. 3

MV Table Worksheet

| MV Tag | Description | MVCostC | MVCostIn | RangeL | RangeH | Mvmove | Calc 1:53LC011.P | dMVm |
|---|---|---|---|---|---|---|---|---|
| 1:53FC038.SV | LCN2absC22 | -6.318109 | -6.318109 | -1000000 | -4.548452 | 0.565079 | -0.085342884 | 0.000000 |
| 2:53LC011.MV | C208OhdLvlv | 0.002543 | 0.002543 | 0.000000 | 10000000 | -412.1652 | -0.002543216 | 0.000000 |
| 3:53PC027.SV | DeethC222X | -0.031133 | -0.031133 | -0.375845 | 0.314155 | -0.258794 | 0 | 0.000000 |
| 4:53TC012.SV | DeethReB | 14.90115 | 14.90115 | 12.22097 | 17.85236 | 0.065525 | 0 | 0.000000 |
| 5:53PC028.SV | DebutC223P | 0.258074 | 0.258074 | 0.043337 | 0.630255 | -5.006201 | 0 | 0.000000 |
| 6:53FC052.SV | DebutC223Rf | -2.206479 | -2.206479 | -3.677624 | 3.665384 | -0.476809 | 0 | 0.000000 |
| 7:53TC010.SV | DebutC223R | 23.65404 | 23.65404 | 19.91921 | 29.25273 | -0.132159 | 0 | 0.000000 |

SYSTEM, METHOD AND PROGRAM FOR DYNAMIC CONTROL AND OPTIMIZATION OF A PROCESS HAVING MANIPULATED AND CONTROLLED VARIABLES

CROSS-REFERENCE TO RELATED APPLICATION

The present application is related and claims priority under 35 U.S.C. §120 to U.S. Provisional Application No. 60/870,730, entitled "Method of Improved Process Control by a Linear Program Objective Function Coefficient and Stable State Calculation," filed on Dec. 19, 2006, the content of which is herein incorporated by reference in its entirety.

BACKGROUND

1. Field of the Disclosure

The present disclosure relates to a system, method and computer readable medium having a computer program stored thereon for dynamic control and optimization of a process or a series of processes.

2. Background Art

An objective in industrial plants is to minimize losses that are inherent in the processes being performed therein, while maximizing profits at the same time. This loss minimization/profit maximization is achieved by the technique of linear programming optimization, which is commonly referred to as LP optimization. Optimization is normally repeated at predetermined intervals so that the profit derivable from the process can be increased by shifting a single unit under control from one operating point to another. Generally, profit can be increased by pushing the operation parameters as close as possible to system constraints, such as temperature, pressure or flow constraints. How close one can approach these constraints becomes a measure of the efficiency of the process control being utilized. Efficiency of the controller in moving from one operating point to another also becomes important. Assuming that LP operating points lie close to, or actually on, system constraints, the controller is desirably able to move from one point to another without violating system constraints. As the controller's ability to adequately perform these tasks decreases, the operating points must retreat from the LP dictated operating points, which thereby causes profit loss. Proper control and optimization of as many constraints as possible allows a user to minimize profit loss.

Linear programming is a mathematical technique that is used to optimize multivariate, bounded linear optimization problems. Linear programming is used in automated processes such as oil refining to identify a profitable or cost-saving operating strategy. The "programming" in LP actually means "planning". In the context of an oil refinery process, for example, the implementation of linear programming involves the development of an integrated LP model representing the refinery operations with all constraints and flexibilities and then solving the LP problem to determine the optimum strategy.

Multivariable constraint control is a technique that is used to control multivariate continuous processes (e.g., refining or oil well production). Linear programming is used to find the optimum point of a multivariate constrained linear problem. The optimum point is that which maximizes (or minimizes) the value of an objective function, where the objective function is the sum of the manipulated values times their value.

SUMMARY

An exemplary system disclosed herein is provided for dynamically adjusting linear program objective function coefficients of variables associated with the performance of a process. The system comprises a database configured to store a plurality of manipulated variables each in respective association with at least one controlled variable dependent on the plurality of manipulated variables. The system comprises a multivariable constraint controller including a linear program optimizer configured to perform a linear program optimization for each association of the manipulated variables and the at least one controlled variable stored in the database. In addition, the system comprises an input unit configured to receive a set of inputted objective function coefficients that cause the linear program optimizer to target a specified set of constraints, and to receive a set of inputted instructions causing the linear program optimizer to perform a linear program optimization for a plurality of combinations of the manipulated variables and the at least one controlled variable being switched on and off. The system also comprises an output unit configured to output the linear program optimization performed by the linear program optimizer for a plurality of the on/off combinations of the manipulated variables and the at least one controlled variable, and to output a notification of whether any on/off combination causes the linear program optimizer to deviate from the specified constraints. The input unit may be configured to, when the output unit outputs the notification, receive modified objective function coefficients causing the linear program optimizer to target the specified set of constraints.

An exemplary method disclosed herein is provided for controlling and optimizing the operation of a process having a plurality of independently controlled, manipulated variables and at least one controlled variable dependent on the manipulated variables. The method comprises inputting specified constraints for a linear program optimizer to target, and calculating a set of objective function coefficients based on the inputted specified constraints. The method also comprises generating a plurality of combinations of manipulated and controlled variables. In addition, the method comprises testing a plurality of the generated combinations for changed values that cause the linear program optimizer to target different constraints than the inputted specified constraints. The method further comprises adjusting the calculated set of objective function coefficients so that the linear program optimizer targets the specified constraints.

An exemplary computer-readable medium having a computer program stored thereon is disclosed herein. The computer program causes a computer to control and optimize the operation of a process having a plurality of independently controlled, manipulated variables and at least one controlled variable dependent on the manipulated variables. The program causes the computer to perform operations of receiving specified constraints for a linear program optimizer to target, and calculating a set of objective function coefficients based on the inputted specified constraints. The program also causes the computer to perform an operation of generating a plurality of combinations of manipulated and controlled variables. In addition, the program causes the computer to perform an operation of testing a plurality of the generated combinations for changed values that cause the linear program optimizer to target different constraints than the inputted specified constraints. The program causes the computer to perform a further operation of adjusting the calculated set of objective function coefficients so that the linear program optimizer targets the specified constraints.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which:

FIG. 1 is a block diagram illustrating components of an exemplary system disclosed herein;

FIG. 2 is a diagram of a controlled variable (CV) table worksheet constituting part of a linear programming strategy calculator worksheet;

FIG. 3 is a diagram of a manipulated variable (MV) table worksheet constituting another part of the linear programming strategy calculator worksheet;

DETAILED DESCRIPTION

Figure 4:
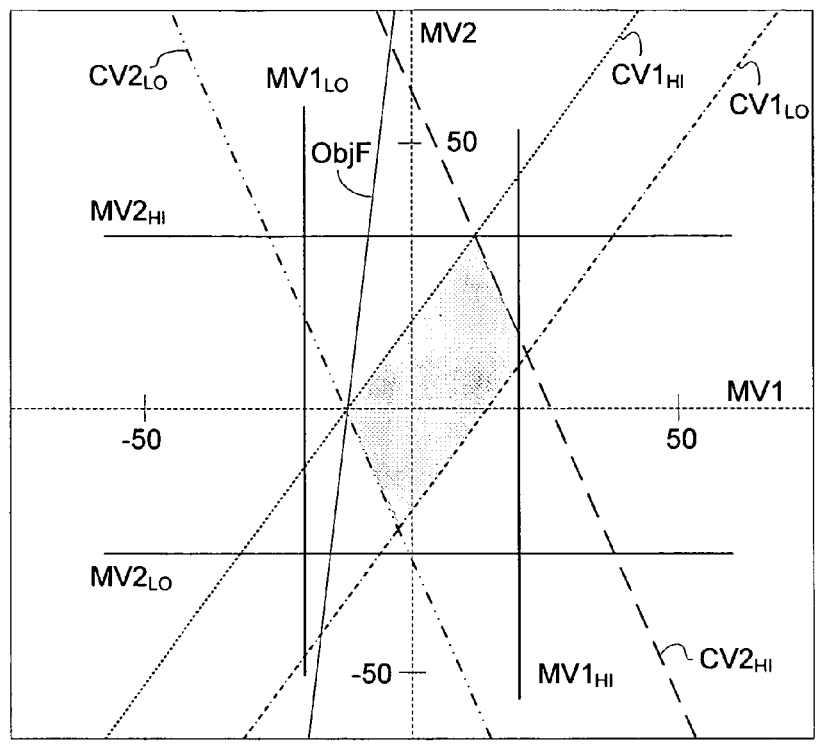
FIGS. 4-7 are diagrams graphically illustrating examples of a matrix of controlled and manipulated variables and the formation of objective functions within the boundaries constraint apexes.

FIG. 1 is a block diagram illustrating an exemplary system 100, consistent with at least one embodiment of the present disclosure. Among other functions, the exemplary system 100 can be provided for dynamically adjusting linear program objective function coefficients of variables associated with the performance of a process. As used herein, "optimization" means finding the best solution within given constraints and flexibilities.

Exemplary system 100 can include a database 110 configured to store a plurality of manipulated variables (MVs) each in respective association with at least one controlled variable (CV) dependent on the plurality of MVs.

As used herein, a "controlled variable" is a variable that can be used in a process and whose value depends on the use or non-use of one or more manipulated variables. As used herein, a "manipulated variable" is a variable whose value can remain constant or be changed to achieve a desired result in a process, such as in a petroleum refining or processing plant, for example. The tense of "manipulated" is not intended to imply that a manipulation of the value has occurred. On the contrary, a "manipulated variable" is intended to convey a manipulatable variable whose value may or may not have been manipulated in the past and may or may not be manipulated in the future.

Controlled variables can be considered to have an algebraic relationship to manipulated variables, in that an increased or decreased use of a manipulated variable can have a proportional affect on one or more controlled variables. The value of a controlled variable can be dependent on one manipulated variable or a plurality of manipulated variables, depending on the variables used in a process and the process itself. The value of a controlled variable can also be dependent on the use or non-use of another controlled variable.

As shown in FIG. 1, the database 110 stores a plurality of manipulated variables MV1 . . . MVN (N>1) each in respective association with a plurality of controlled variables (CV1 . . . CVN). A particular MV stored in the database 110 can have one or more CVs in common with another MV, although the respective dependence of the common CVs on the different MVs can be different.

The exemplary system 100 can include a multivariable constraint controller 120 (LP controller) that includes a linear program optimizer (LP optimizer) configured to perform a linear program optimization for a plurality of associations of the MVs and the at least one CV stored in the database 110. The LP optimizer can also be configured to perform a linear program optimization on each association of the MVs and CV(s) stored in the database 110.

The LP controller 120 can be a component of a computer or workstation equipped in an environment in which a process is to be performed, or in a separate environment for controlling the process to be performed. Alternatively, the LP controller 120 can be an independent device in either of the aforementioned environments. According to the configuration illustrated in FIG. 1, the LP controller 120 is included in a computer workstation of an industrial environment, and is connected to the database 110 via a network 160. The network 160 may be a private network such as a virtual private network (VPN) or a LAN, for example. Alternatively, the network 160 may be a public network such as the Internet, for example.

The system can also include an input unit such as a keyboard 130 and mouse 140 or other pointing device as shown in FIG. 1. The input unit is configured to receive a set of inputted objective function coefficients that cause the LP optimizer to target a specified set of constraints.

A constraint of a process can include a CV that is targeted to be output, produced or optimized in a particular process. The set of constraints can include a high value and a low value of at least one CV, respectively identifying a desired upper limit value and a lower limit value of the CV for the process. In the case where the LP optimizer is intended to target several CVs, the set of constraints can include an upper limit value and a lower limit value of a first CV, an upper limit value and a lower limit value of a second CV, an upper limit value and a lower limit value of a third CV, etc.

For example, in the case of an oil refinery process, CVs can include the amount of yield to be produced, such as the amount of refined oil to be produced, a heating fluid, an overhead drum level, a feed valve, de-ethaniser pressure, debutanizer pressure, etc. The input unit can receive the targeted set of constraints for the process from an operator via the keyboard 130 and/or mouse 140. Alternatively, the operator can select the targeted set of constraints from among previously stored constraints stored in a storage device, such as the database 110 or a memory unit of the LP controller 120.

Objective function coefficients can relate to the respective values of MVs that may be used in the performance of a particular process. Accordingly, the plurality of MVs stored in respective association with at least one CV in the database 110 can be data values of at least one of materials, functions, parameters and process controls for performing an automated function, such as in an industrial environment, where the use and/or non-use of the MVs proportionally affect the CVs used in the process.

Similar to CVs, MVs can also be designated with upper and lower limit values, with each MV potentially having a distinct upper and lower limit value from another MV. The upper and lower limit values of one or more MVs are to be taken into consideration when the objective function coefficients are inputted to the input unit to cause the LP optimizer to target the specified set of constraints. As described above, the objective function coefficients include respective values of the plurality of MVs. Therefore, the values of the plurality of the MVs can be dependent on whether each MV reaches its upper or lower limit.

The concept underlying the formation of linear program objective function coefficients in the exemplary system 100 is explained below with reference to FIGS. 4-7.

FIG. 4 is a graph illustrating a two dimensional example of a two-by-two MV to CV matrix of variables to be processed by the LP optimizer in the multivariable constraint controller 120. Alternately patterned lines extending diagonally in FIG. 4 represent high and low limits of a first controlled variable CV1 ($CV1_{HI}$ and $CV1_{LO}$) and high and low limits of a second controlled variable CV2 ($CV2_{HI}$ and $CV2_{LO}$). $CV1_{HI}$, $CV1_{LO}$, $CV2_{HI}$ and $CV2_{LO}$ are constraints for the LP optimizer to target and optimize.

Solid lines extending vertically in FIG. 4 represent high and low limits of a first manipulated variable MV1 ($MV1_{HI}$ and $MV1_{LO}$). Solid lines extending horizontally in FIG. 4 may represent high and low limits of a second manipulated variable MV2 ($MV2_{HI}$ and $MV2_{LO}$). $MV1_{HI}$, $MV1_{LO}$, $MV2_{HI}$ and $MV2_{LO}$ also represent constraints for the process to be performed.

The shadowed region in FIG. 4 represents a possible operating region bounded by all the constraints. An objective function ObjF is also represented in FIG. 4 by a solid line. In the example of FIG. 4, the minimum value of the objective function ObjF is at the intersection of $CV1_{HI}$ and $CV2_{LO}$ within the boundary operating region. The minimum value of the objective function ObjF at the intersection of $CV1_{HI}$ and $CV2_{LO}$ represents the LP solution in the example of FIG. 4.

The slope of the objective function ObjF is dependent upon the cost coefficients of the MV variables, as shown by the following equation.

$$ObjF=(Cost1*MV1)+(Cost2*MV2)$$

Figure 5:
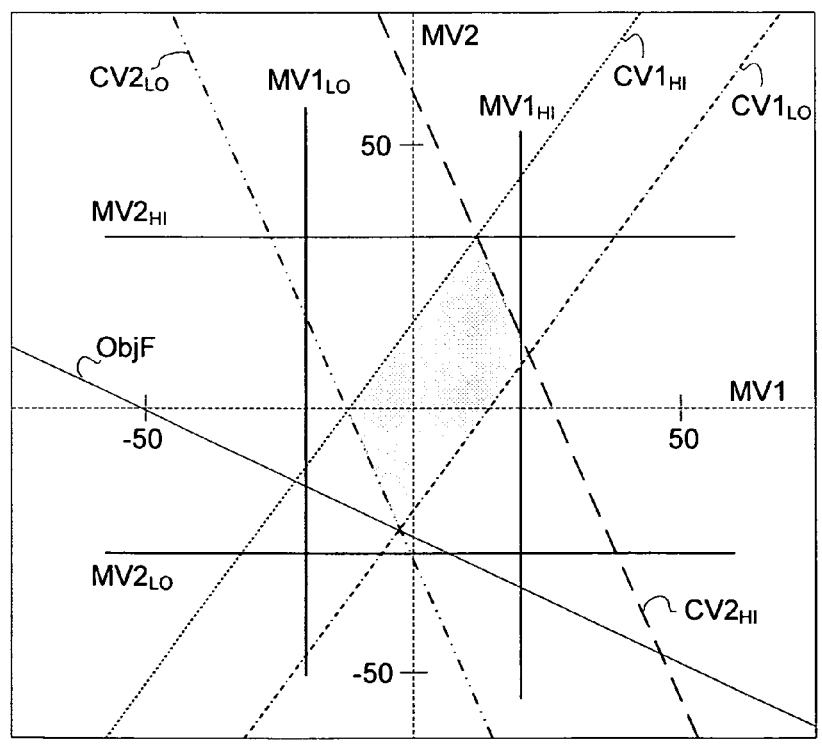

With reference to FIG. 5, the slope of the objective function ObjF has been rotated by approximately 45 degrees by adjusting the cost of manipulated variable MV1. In the example of FIG. 5, the minimum value of the objective function ObjF (i.e., the LP solution) is at the intersection of $CV1_{LO}$ and $CV2_{LO}$.

Figure 6:
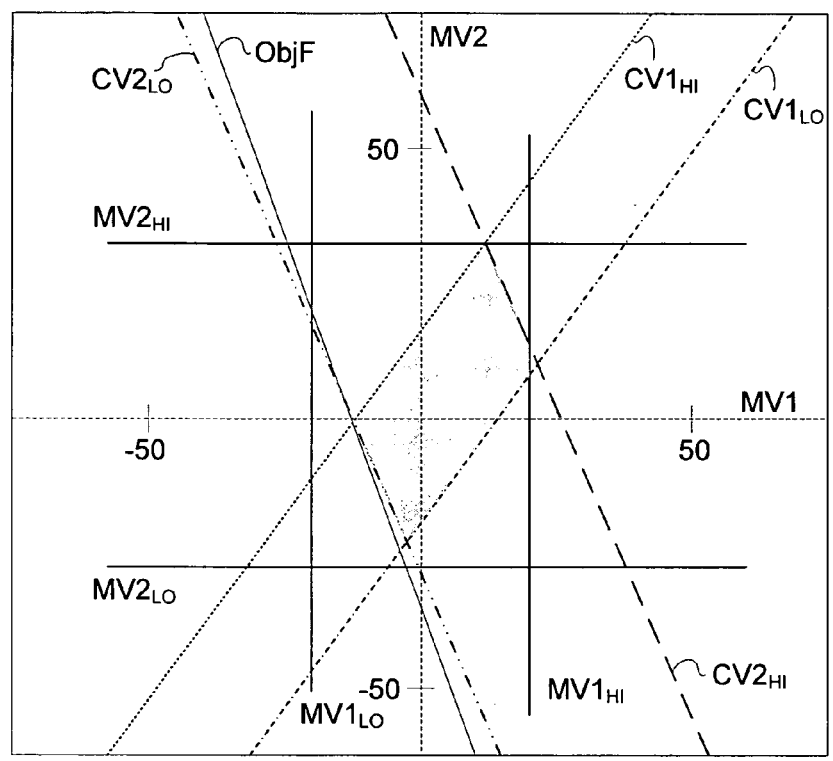

With reference to FIGS. 5 and 6, the objective function ObjF in FIG. 5 has moved from one constraint apex (the intersection of $CV1_{LO}$ and $CV2_{LO}$) to another constraint apex in FIG. 6, i.e., the intersection of $CV1_{HI}$ and $CV2_{LO}$. The objective function ObjF will not be at a minimum at the original apex of FIG. 5 (the intersection of $CV1_{LO}$ and $CV2_{LO}$) once the slope of the objective function is greater than the slope of $CV2_{LO}$. Accordingly, it is possible to calculate the slope required to operate at a particular constraint apex from the slopes (gains) of the variables involved.

This is a concept underlying the formation of linear program objective function coefficients in the exemplary system 100. The concept is to define a CV constraint apex corresponding to a strategy, at which an operator would ideally like the controller LP to push towards, and then calculate the MV cost coefficients that are required to ensure that the strategy occurs.

Figure 7:
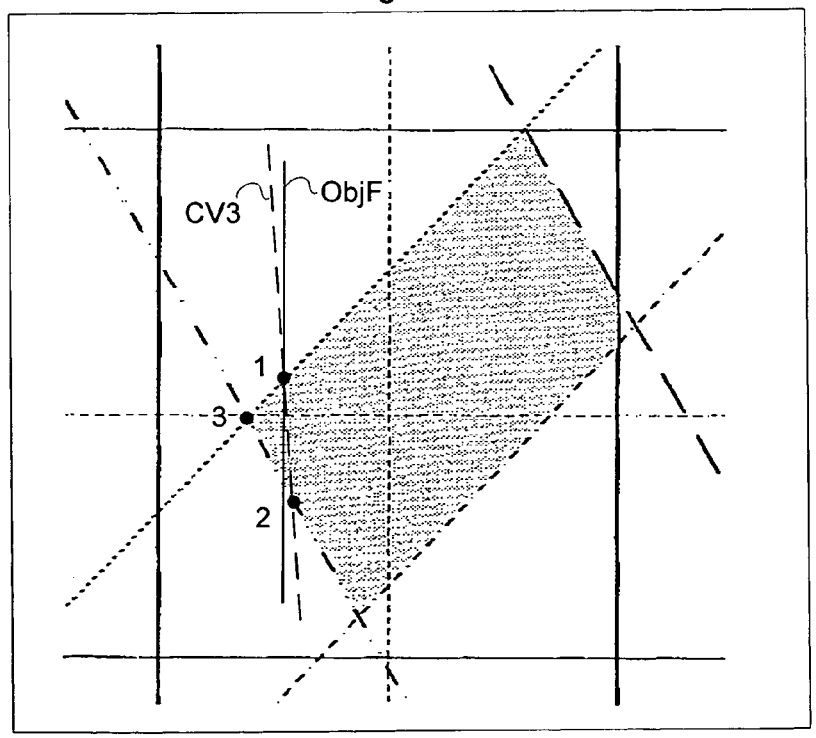

FIG. 7 is an enlarged view of the operating region illustrated in FIGS. 4-6. The example of FIG. 7 is used to illustrate the modification of an objective function when a constraint is switched into or out of the controller LP. The objective function ObjF shown in FIG. 7 is heading toward the constraint apex 3 as in FIGS. 4 and 6 described above. However, another constraint CV3 is constraining the objective function ObjF at apex 1. The following observations are made from the example of FIG. 7: (a) a small reduction in the slope of the objective function ObjF would mean that apex 2 would be the constraint apex instead of apex 1; (b) switching off the constraint CV3 would move the objective function (LP solution) to apex 3 with corresponding adjustments or manipulations of MV1 and/or MV2; and (c) if the control LP was operating at apex 2 and the constraint CV3 was removed (e.g., switched off), the movement in MV2 to arrive at apex 3 is far greater than if the control LP was originally constrained at apex 1.

The example of FIG. 7 illustrates another concept underlying the formation of linear program objective function coefficients in the exemplary system 100. The LP controller 120 will not only calculate MV cost coefficients that are required to drive the LP optimizer toward a defined constraint apex, it can also adjust cost coefficients so that MV movement is minimized when constraints are switched on and off.

In some cases, it may be desirable to operate at constraint apex 2 as illustrated in FIG. 7. In this case, if the movement in MV2 is large when the CV3 constraint is switched off, it may be desirable to switch MV2 off at the same time, to prevent large and perhaps undesirable movement in MV2. The LP controller 120 provides a mechanism to link CV and MV states so that a stable strategy can be developed. The mechanism to link CV and MV states will be further described below.

As described above, the MVs are stored in the database 110 in respective association with at least one CV dependent on the plurality of MVs. The LP optimizer performs a linear program optimization for each association of the MVs and the at least one CV stored in the database 110. Switching a CV on and off or alternating other constraint conditions by adding or modifying CVs and/or MVs may cause the LP optimizer to more closely target the specified constraints. An operator may also desire to alter the constraint conditions to investigate which combinations of constraint conditions desirably optimize the process. That is, optimization of the process may be achieved by adjusting the combinations of the MVs and CV(s) and then causing the LP optimizer to again perform a linear program optimization for the adjusted values of the MVs and CVs. It is advantageous to iteratively cause the LP optimizer to perform an LP optimization for a plurality or all combinations of MVs and CV(s) being switched off and/or for a plurality of combinations having altered conditions. Accordingly, the input unit of the exemplary system 100 can also be configured to receive a set of inputted instructions causing the LP optimizer to perform a linear program optimization for a plurality of combinations in which the MVs and the at least one CV are switched on and off, and/or for a plurality of combinations reflecting alternate constraint conditions.

The exemplary system 100 also includes an output unit 150 configured to output the linear program optimization performed by the LP optimizer for an on/off combination of the MVs and the at least one CV, and to output a notification of whether any on/off and/or altered combination causes the LP optimizer to deviate from the specified constraints inputted via the input unit. Altering the values of a combination by switching the values of a CV and MV on or off or modifying the combination by the addition of other constraints can cause the LP optimizer to target the specified constraints, but it can also cause the LP optimizer to deviate from the specified constraints. The LP optimizer functions to optimize a process based on the values of combinations of MVs and CVs that it utilizes. Therefore, it is conceivable that altering the combinations of MVs and CVs may cause the LP optimizer to deviate from the targeted constraints.

Accordingly, the output unit 150 can be configured to output the linear program optimization performed by the LP optimizer for every combination of MVs and CVs for which it performs a linear program optimization. The output unit 150 can be configured to output a notification for any altered combination of values of MVs and CVs that cause the LP optimizer to deviate from the specified constraints. The degree of deviation or divergence can be uniquely defined by the operator for a particular process (e.g., 20-40%). Alternatively, the degree of deviation or divergence can be system-defined to remain within a predetermined range for all processes. Thus, the output unit 150 can be configured to output the notification whether any on/off combination or other altered combination causes the LP optimizer to deviate from the specified constraints to a predetermined degree of divergence. For example, the notification can be output by altering the color of the value of a CV or MV in a worksheet table, or highlighting or altering the color of a cell in which the value of the CV or MV appears in a worksheet table. The present disclosure is not limited to the aforementioned examples of the notification. Any form of notification can be output by the output unit 150 to alert an operator that an on/off combination or altered combination of a CV and MV causes the LP optimizer to deviate from the specified constraints to a predetermined degree of divergence. Another notification can also be output to indicate that an altered combination of CV and MV values causes the LP optimizer to remain within the specified constraints.

The input unit can be configured to receive modified objective function coefficients that cause the LP optimizer to target the specified constraints, when the output unit outputs the notification indicating that an on/off and/or altered combination caused the LP optimizer to deviate from the specified constraints to a defined degree of divergence.

Accordingly, in the exemplary system 100, a targeted set of constraints of at least one CV is specified and inputted via the input unit, and a set of objective function coefficients are inputted via the input unit to cause the LP optimizer to target the specified set of constraints. The set of objective function coefficients can be the values (e.g., costs) of MVs based on the desired set of constraints that are the objective of optimization in the process to be performed.

The output unit 150 can be a display unit configured to display the associations of the MV and the at least one CV of each MV stored in the database 110, and to display a linear program optimization performed by the LP optimizer. FIG. 2 illustrates an example of an initial CV table worksheet output by the output unit 150, and FIG. 3 illustrates an example of an initial MV table worksheet output by the output unit 150. For ease of viewing, the CV table worksheet and the MV table worksheet can be joined as one worksheet. In this instance, the values of the first seven CVs 1-7 identified under the "CV Tag" column of FIG. 2 respectively correspond to the values of the seven MVs 1-7 identified under the "MV Tag" column of FIG. 3.

The CV and MV worksheets illustrated in FIGS. 2 and 3 are examples of worksheets output by the output unit 150, and enable an operator to perform a plurality of strategy calculations via the input unit and the LP controller 120 based on the MV and CV values stored in the database 110. The CV and MV worksheets depict the linear programming problem to be solved. The CV and MV worksheets can include a number of different color coded or modified designations of various items contained in the LP controller 120. The CV worksheet of FIG. 2 is a table of data devoted to CV entities, one table row per each CV. The MV worksheet of FIG. 3 is a table of data devoted to MV entities, one row per each MV.

The first three columns in the CV worksheet contain typically static CV information such as a tag name (CV Tag), a description and a strategy definition (Strategy). The tag name and description for each CV can be read from definitions contained in the LP controller 120, or they can be associated with the CV in the database 110 and imported from the database 110. An operator can edit the CV Tag and description of each CV. The strategy value of each CV can be defined by an operator according to the limiting constraints of the process. For example, an operator can select to maximize or minimize a particular CV via the input unit. The strategy value of a CV can also be cleared if desired.

The next six columns contain dynamic definition data of the LP controller 120, such as CV low limit (LoLim), current CV value (Current), CV high limit (HiLim), CV shadow value (ShadV) and MV gain. The CV low and high limits represent target values for a CV strategy. These values set the constraint limits for the CV. Any value can be entered directly into the CV table worksheet via the input unit. An objective for setting larger or smaller values for CV limits is to ensure that calculated MV and CV movement at the objective function (LP solution) will match a typical movement that occurs during the process. The CV low and high limits can be manually set, or they can be automatically set according to the strategy selection. The low or high limits of a CV can be emphasized whenever the LP optimization performed by the LP optimizer is constrained by the identified limits. The current value of a CV represents the movement calculated by the current LP solution.

The range value of a CV is non-zero only if one of the limits for the CV is active. The range value shows how far the active limit can be moved before the LP solution point changes. The shadow value of a CV is non-zero only if one of the limits for the CV is active. The shadow value indicates how much the objective function will change if the limit is moved by one unit.

The Calc column shows the gain, relative gain, and scaled relative gain of the last clicked MV row. The gain/relative gain/scaled relative gain display can be toggled by setting various "Calc" options of the LP controller 120.

Through the input unit, an operator can link a CV to a particular MV. This linkage is used by the LP optimizer when it attempts to find an optimal set of LP costs. The linkage ensures that whenever the CV is switched off, the linked MV is also switched off. This linkage will limit pivot options to the linear programming and will afford the LP optimizer a better opportunity to find an optimal set of LP costs. From a process point of view, it is desirable to link a CV to a MV in this way, as in most cases, a strategy CV will have a relative gain that is linked to the MV. One or more CVs can be linked to a particular MV. When a CV is coupled to a MV, the strategy column entry for that CV reflects the linkage. Assuming, for example, that the strategy column entry for CV3 was changed to "MAX" from "none", and that CV3 is to be linked to MV4, the strategy column entry for CV3 can be expressed as "MAX-4" to indicate that the strategy of CV3 is to maximize this CV and link it to MV4.

The next two columns in the CV table worksheet represent cost data of a CV (CV Cost) and MV movement totals (MV-Sum). The CV Cost value of a CV can be set by the selected strategy of the CV, but it can also be entered manually via the input unit. The value entered can represent actual cost data for the CV if it is known. In order to represent actual cost data accurately, the value should correspond to the movement made by the LP solution. For example, if a CV cost is $3 per unit and the CV high limit is set at 7.5, then the cost should be set to $22.50. The MV Sum value of a CV represents the total summed absolute difference of MV movement between LP solutions with the CV (and linked MV if any) being switched on, and the CV (and linked MV if any) being switched off. These values are updated when the variable is switched on/off manually or by the LP optimizer.

FIG. 3 illustrates an example of an initial MV table worksheet output by the output unit 105. The first column in the MV table worksheet represents a MV tag name (MV Tag). This column displays the tag name and numbers of the MVs. If a MV is linked to a strategy CV, that CV number is appended to the end of the tag name and the tag name is emphasized. The next column represents a description of each MV.

The next column in the MV table worksheet contains a calculated MV cost (MVCostCL). This column contains the cost calculated from the strategy CVs that will guide the LP solution toward the desired set of CV constraints (limiting constraints). The Input MV cost (MVCostIn) column contains the linear programming input MV costs. These costs represent the objective function coefficients that are received by the input unit by the operator to cause the LP optimizer to target the specified CV constraints.

The RangeL and RangeH columns contain values respectively indicating how low and high the cost coefficients can be altered before the LP solution will change. The Calc column contains the gain, relative gain or scaled relative gain of the last clicked CV row depending on selectable options defined in the LP controller 120. The tag name of the CV of interest is indicated at the top of the column, as shown in FIG. 3. The "Mvmove" column represents MV movement, which indicates the MV movement made by the linear program optimization for the current solution. The entries in this column can be distinguished to represent positive and negative values. The last column shown in the MV table worksheet of FIG. 3 indicates the change in MV movement between the current LP solution and the previous LP solution. The movement values can be represented by absolute values that are summed and entered into the MVSum column of the CV table when a particular CV is switched on or off.

The CV and MV table worksheets illustrated in FIGS. 2 and 3 are displayed to an operator by the output unit 150. As mentioned above, some of the values in these tables are editable by the operator. On the other hand, other values in these tables represent variables obtained when the LP optimizer performs the linear program optimization based on the values entered into the tables. For instance, as described above, the Input MV cost (MVCostIn) column of the MV table contains the linear programming input MV costs representing the objective function coefficients.

MVs and CVs can be turned on and off. Turning a MV off means that the MV is clamped at it is current position. Turning a CV off means that the CV limits are set to be wide (e.g., −10,000 to 10,000). Accordingly, when receiving an input to test a particular combination in which the MV is switched off to determine if the changed value of MV causes the LP optimizer to deviate from the specified CV constraints, the LP controller 120 causes the controller to perform the linear program optimizer in accordance with the value of manipulated MV remaining unvaried.

MVs and CVs can also be deactivated. This has the effect of dropping the deactivated CV or MV out of the LP problem. A deactivated CV or MV is not utilized by the LP optimizer when performing a linear program optimization, and will remain deactivated until it is switched on.

The table worksheets output by the output unit 150 enable the operator of the system to effectively optimize a process. In particular, a set of objective function costs is calculated to ensure that the LP optimizer within the LP controller 120 targets a specified set of constraints, such as CV constraints. Then, a plurality of combinations of MVs and CVs having changed values that can exist in the controller LP controller 120 are checked to determine whether any of the changed values or states cause the LP optimizer to target different constraints than those specified. If it is determined that the changed values or states of the combinations of CVs and MVs cause the LP optimizer to target different constraints, the objective function coefficients are adjusted so that the targeted constraints remain consistent for as many states as possible.

Figure 8:
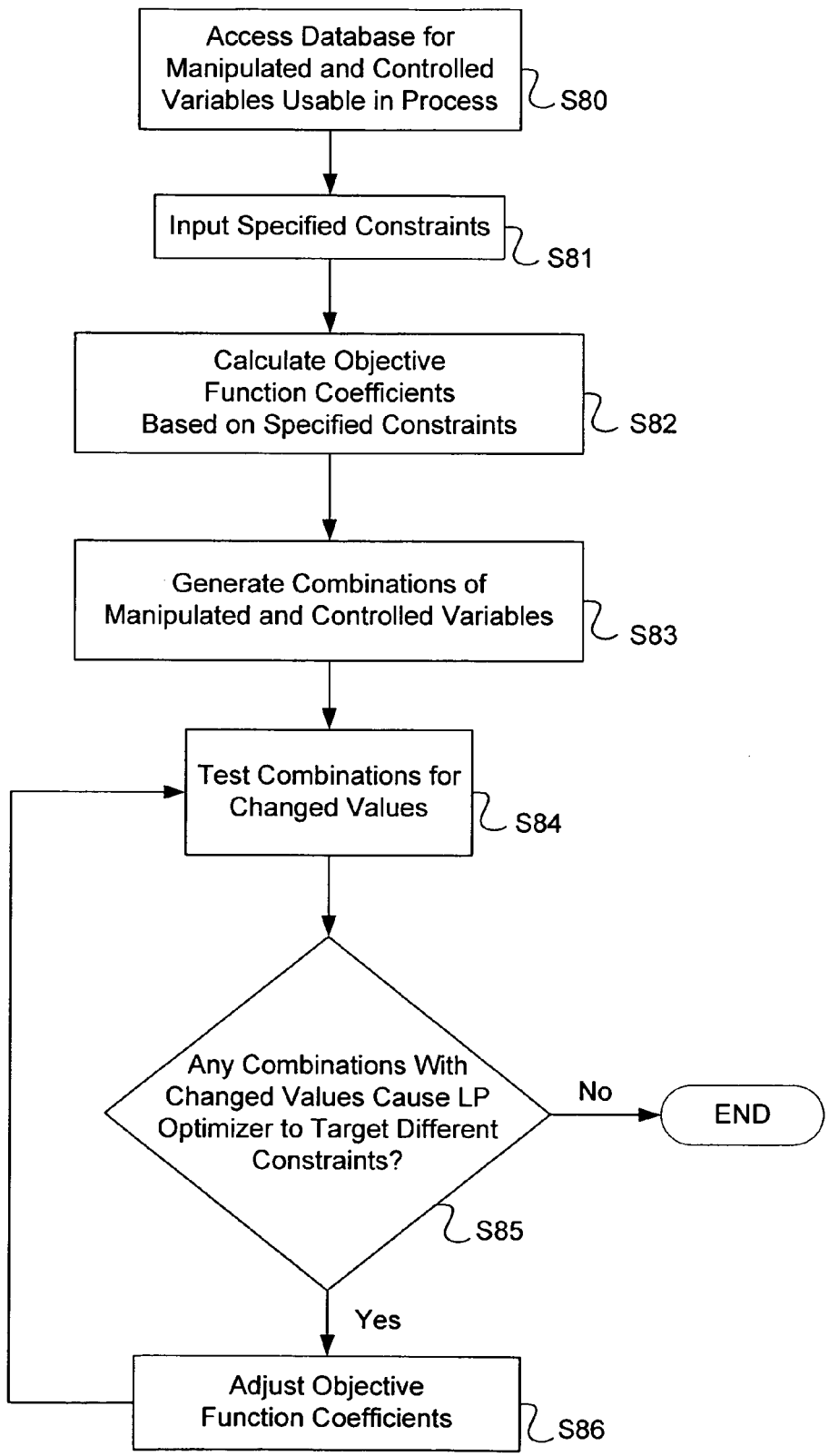
FIG. 8 is a flowchart illustrating an exemplary method of controlling and optimizing the operation of a process having a plurality of independently controlled, manipulated variables and at least one controlled variable dependent on the manipulated variables.

FIG. 8 is a flowchart illustrating an exemplary method of controlling and optimizing the operation of a process having a plurality of independently controlled, manipulated variables and at least one controlled variable dependent on the manipulated variables.

As shown in FIG. 8, the database 110 is accessed for MVs and at least one CV associated with and dependent on the MVs to be used in a process (step S80).

Specified constraints for a linear program optimizer to target are input (step S81). As described above, the specified constraints can include a high value and a low value for at least one CV. The specified constraints can also include an upper limit value and a lower limit value of a first CV, an upper limit value and a lower limit value of a second CV, and an upper limit value and a lower limit value of a third CV, etc. The step of inputting the specified constraints can include inputting at least one of a cost and output quantity of at least one CV. Accordingly, the specified constraints can include at least one CV that is desired to be output, manufactured or optimized in a particular process.

A set of objective function coefficients are calculated based on the inputted specified constraints (step S82). The term "calculated" is not intended to be limited to performing a mathematical calculation to determine the objective function coefficients. As described above, the objective function coefficients can include respective values (i.e., costs) of the MVs. An operator familiar with a process can determine or estimate the values of MVs that can cause the LP optimizer to target the specified constraints.

A plurality of combinations of MVs and CVs are generated (step S83). The combinations can be the MVs and CVs accessed from the database 110 as well as MVs and CVs whose values are modified in the manner as described above. For example, each combination of a MV and CV can include respective values of the CV when the MV is activated and deactivated. Each combination of a MV and CV can also include respective values of the CV and MV when the CV is switched on and off.

Next, a plurality of the generated combinations are tested for changed values that cause the LP optimizer to target different constraints than the inputted specified constraints (step S84). Similar to the exemplary system 100 described above, the test is performed to determine whether a plurality of the generated combinations target a different constraint than the inputted specified constraints, to a predetermined degree of divergence. Step S84 can include testing each of the generated combinations for changed values that cause the LP optimizer to target different constraints than the inputted specified constraints.

The testing of the plurality or each of the generated combination for changed values can include switching at least one of the CV and the MV of each combination from on to off to determine whether the change of the at least one of the CV and the MV causes the LP optimizer to target different constraints than the inputted specified constraints. Similar to the exemplary system 100 described above, the LP optimizer can be embodied in a multivariable constraint controller.

The exemplary method can also include a step of outputting a notification for every generated combination whose changed values cause the linear program optimizer to target different constraints than the inputted specified constraints.

If the test reveals that the changed values of the combinations cause the LP optimizer to target different constraints than the inputted specified constraints, the calculated set of objective function coefficients are adjusted so that the linear program optimizer targets the specified constraints (Step S85). Steps S84 and S85 are then repeated for the adjusted set of objective function coefficients. A notification can be output.

As shown in FIG. 8, the process flow ends if the test reveals that none of the changed values of the combinations caused the LP optimizer to target different constraints than the inputted specified constraints.

Accordingly, similar to the exemplary system 100 described above, a set of objective function costs is calculated to ensure that the LP optimizer within a multivariable constraint controller targets a specified set of constraints. Then, a plurality of combinations of MVs and CVs having changed values that can exist in the LP controller are checked to determine whether any of the changed values or states cause the LP optimizer to target different constraints than those specified. If it is determined that the changed values or states of the combinations of CVs and MVs cause the LP optimizer to target different constraints, the objective function coefficients are adjusted so that the targeted constraints remain consistent for as many states as possible.

An exemplary embodiment of the present disclosure provides a computer-readable medium having a program stored thereon that causes a computer to control and optimize the operation of a process having a plurality of independent controlled MVs and at least one CV dependent on the MVs. The program causes the computer to perform operations corresponding to the above-described steps of the exemplary method. Accordingly, a repeated description is omitted.

The program can be embodied on a computer-readable medium either alone or in conjunction with other software platforms that are configured to perform multivariate constraint control using linear programming. For example, the program can be incorporated with platforms used in industrial environments, such as Refinery & Petrochemical Modeling System (RPMS) produced by Honeywell Hi-Spec Solutions, Process Industry Modeling System (PIMS) produced by Aspentech, Dynamic Matrix Control Plus (DMC+) produced by Aspentech, and GRMPTs produced by Haverly.

Combinations of the above-described exemplary embodiments, and other embodiments not specifically described herein will be apparent to those skilled in the art upon reviewing the above description. The scope of the various exemplary embodiments includes various other applications in which the above system, method and program can be implemented.

It will be appreciated by those skilled in the art that the exemplary embodiments of the present disclosure can be embodied in other specific forms without departing from the spirit or essential character thereof. The presently disclosed embodiments are considered in all respects to be illustrative and not restrictive. The scope of the invention is indicated by the appended claims rather than the foregoing description, and all changes that come within the meaning and range of equivalents thereof are indicated to be embraced therein.

What is claimed is:

1. A system for inputting and dynamically adjusting linear program objective function coefficients corresponding to cost values of manipulated variables associated with optimizing profitability of an industrial process, the manipulated variables comprising one or more of functions, parameters, or process controls for performing automated functions in or associated with the process, the inputted and adjusted coefficients used to target specified constraints comprising controlled variables that depend at least in part on the use or non-use of one or more of the manipulated variables, the controlled variables comprising a constraint on product use or production in the process, the system comprising:
   a storage device comprising a database configured to store a plurality of manipulated variables each in respective association with at least one controlled variable dependent on the plurality of manipulated variables;
   a multivariable constraint controller comprising a processor and a linear program optimizer configured to perform a linear program optimization for each association of the manipulated variables and the at least one controlled variable stored in the database;
   an input unit configured to receive a set of inputted objective function coefficients that cause the linear program optimizer to target a specified set of constraints, and to receive a set of inputted instructions causing the linear program optimizer to perform a linear program optimization for a plurality of combinations of the manipulated variables and the at least one controlled variable, wherein each combination comprises respective values of a controlled variable when an associated manipulated variable is activated and deactivated; and
   an output unit configured to output the linear program optimization performed by the linear program optimizer for a plurality of the on/off combinations of the manipulated variables and the at least one controlled variable, and to output a notification of whether any on/off combination causes the linear program optimizer to deviate from the specified constraints,
   wherein, when the output unit outputs the notification, the input unit is configured to receive through operator input modified objective function coefficients causing the linear program optimizer to target the specified set of constraints while minimizing movement of the manipulated variables.

2. The system of claim 1, wherein the plurality of manipulated variables stored in respective association with at least one controlled variable in the database are data values of at least one of materials, functions, parameters and process controls for performing an automated process in an industrial environment.

3. The system of claim 2, wherein the multivariable constraint controller is comprised in a computer workstation of the industrial environment, and is connected to the database via a network.

4. The system of claim 1, wherein the input unit is configured to receive the set of constraints from an operator, the set of constraints including a high value and a low value for at least one controlled variable.

5. The system of claim 1, wherein the set of constraints include an upper limit value and a lower limit value of a first controlled variable, and an upper limit value and a lower limit value of a second controlled variable.

6. The system of claim 1, wherein the input unit is configured to receive an input linking at least one controlled variable to at least one of the manipulated variables.

7. The system of claim 6, wherein the controller is configured to turn off a manipulated variable linked to a controlled variable when the controlled variable is switched off.

8. The system of claim 1, wherein the input unit is configured to receive an input of additional controlled variables.

9. The system of claim 1, wherein the input unit is configured to receive an input instructing one of the manipulated variables to be switched off, and the controller receiving the input to switch off the one of the manipulated variables is configured to cause the linear optimizer to perform the linear program optimization in accordance with the value of the one of the manipulated variables remaining unvaried.

10. The system of claim 1, wherein the output unit is a display unit configured to display the associations of the manipulated variables and the at least one controlled variable of each manipulated variable stored in the database, and to display the linear program optimization performed by the linear program optimizer.

11. The system of claim 1, wherein the output unit is configured to output the notification whether any combination subject to activation and deactivation causes the linear program optimizer to deviate from the specified constraints to a predetermined degree of divergence.

12. A method of controlling and optimizing profitability of an industrial process having a plurality of independently controlled, manipulated variables with associated cost values and at least one controlled variable dependent on the manipulated variables, the manipulated variables comprising one or more of functions, parameters, or process controls for performing automated functions in or associated with the process, the cost values used to target specified constraints comprising the controlled variable or variables, the controlled variables comprising a constraint on product use or production in the process, the method comprising:
   inputting specified constraints for a linear program optimizer to target;
   calculating a set of objective function coefficients that cause a linear program optimizer executed by a processor to target the inputted specified constraints;
   generating a plurality of combinations of manipulated and controlled variables, wherein each combination comprises respective values of a controlled variable when an associated manipulated variable is activated and deactivated;
   testing a plurality of the generated combinations for changed values for one or both of the manipulated and controlled variables among the plurality of combinations that cause the linear program optimizer to target different constraints than the inputted specified constraints; and
   adjusting through operator input the calculated set of objective function coefficients so that the linear program optimizer targets the specified constraints and minimizes movement of the manipulated variables when constraints are switched on and off to stabilize the process.

13. The method of claim 12, wherein the inputting of the specified constraints comprises inputting at least one of a cost and output quantity of the at least one controlled variable.

14. The method of claim 12, wherein the specified constraints include at least one controlled variable that is desired to be output in the process.

15. The method of claim 12, wherein the set of objective function coefficients include the respective cost values of the plurality of manipulated variables.

16. The method of claim 12, wherein each combination of a manipulated variable and a controlled variable includes respective values of the controlled variable when the manipulated variable is activated and deactivated.

17. The method of claim 12, wherein each combination of a manipulated variable and a controlled variable includes respective values of the controlled variable and the manipulated variable when the controlled variable is switched on and off.

18. The method of claim 12, wherein the testing of the generated combinations for changed values further comprises switching at least one of the controlled variable and the manipulated variable of each combination from on to off to determine whether the change of the at least one of the controlled variable and the manipulated variable causes the linear program optimizer to target different constraints than the inputted specified constraints.

19. The method of claim 12, wherein the testing of the generated combinations comprises testing each of the generated combinations for changed values that cause the linear program optimizer to target different constraints than the inputted specified constraints.

20. The method of claim 12, comprising outputting a notification for every generated combination whose changed values cause the linear program optimizer to target different constraints than the inputted specified constraints.

21. The method of claim 12, wherein the linear program optimizer is comprised in a multivariable constraint controller.

22. A computer-readable medium having a computer program stored thereon that causes a computer to control and optimize profitability of a process having a plurality of independently controlled, manipulated variables with associated cost values and at least one controlled variable dependent on the manipulated variables, the manipulated variables comprising one or more of functions, parameters, or process controls for performing automated functions in or associated with the process, the cost values used to target specified constraints comprising the controlled variable or variables, the controlled variables comprising a constraint on product use or production in the process, the program causing the computer to perform operations of:
   receiving specified constraints for a linear program optimizer to target;
   calculating a set of objective function coefficients that cause a linear program optimizer executed by a processor to target the inputted specified constraints;
   generating a plurality of combinations of manipulated and controlled variables, wherein each combination comprises respective values of a controlled variable when an associated manipulated variable is activated and deactivated;
   testing a plurality of the generated combinations for changed values for one or both of the manipulated and controlled variables among the plurality of combinations that cause the linear program optimizer to target different constraints than the inputted specified constraints; and
   adjusting through operator input the calculated set of objective function coefficients so that the linear program optimizer targets the specified constraints and minimizes movement of the manipulated variables when constraints are switched on and off to stabilize the process.

* * * * *